United States Patent [19]

Landau et al.

[11] Patent Number: 5,023,151
[45] Date of Patent: Jun. 11, 1991

[54] POWER PLANT COGENERATION CONTROL

[75] Inventors: Michael B. Landau, West Hartford; George Vartanian, Ellington, both of Conn.; Kazuyuki Matsuzawa, Urayasu, Japan

[73] Assignee: International Fuel Cells Corporation, S. Windsor, Conn.

[21] Appl. No.: 591,315

[22] Filed: Oct. 1, 1990

[51] Int. Cl.$^5$ .............................................. H01M 8/04
[52] U.S. Cl. ......................................... 429/24; 429/26
[58] Field of Search ...................... 429/24, 26, 34, 12, 429/90, 120

[56] References Cited

U.S. PATENT DOCUMENTS

| | | | |
|---|---|---|---|
| 3,964,930 | 6/1976 | Reiser | 429/26 |
| 4,640,873 | 2/1987 | Tajima et al. | 429/24 |
| 4,824,740 | 4/1989 | Abrams et al. | 429/24 |

Primary Examiner—Anthony Skapars
Attorney, Agent, or Firm—Edward L. Kochey, Jr.

[57] ABSTRACT

Fuel cell coolant loop (2) is to be controlled to maintain set point 38 temperature of the return coolant. Waste heat heat exchanger 10 is controlled to maintain set point 22 temperature in the waste heat fluid. Heat rejection heat exchanger removes additional heat as required to maintain the set point (38) temperature.

If both set point temperatures cannot be maintained, a control override allows the waste heat fluid temperature to drop.

7 Claims, 2 Drawing Sheets

5,023,151

POWER PLANT COGENERATION CONTROL

TECHNICAL FIELD

The invention relates to fuel cell power plants and in particular to cooperative control between the fuel cell power plant and a waste heat recovery system.

BACKGROUND OF THE INVENTION

In fuel cell power plants the fuel cells generate heat which must be removed. This is accomplished by circulating coolant, usually water, through the fuel cell and through a heat rejection system.

Optimum operation of the fuel cells is accomplished at a particular temperature level which will vary on load at the plant. Accordingly, this heat rejection loop is controlled to maintain the inlet temperature to the fuel cell at a level which provides the appropriate operating temperature.

With only the fuel cell of concern this heat is rejected to waste. However, to achieve improved efficiency of the power plant it is preferable to utilize at least a portion of this waste heat which would otherwise be rejected. It is normally preferable to use this heat at the highest temperature level possible, and the waste heat system is designed with this in mind over the load range.

A heat exchanger is provided to transfer heat from the recirculating coolant to the waste heat fluid. The waste heat system is designed to operate at some particular temperature, and the heat exchanger is controlled to vary the heat exchange through the heat exchanger and maintain this temperature.

In order that proper control of the return fluid to the fuel cell can be achieved, a second heat rejection heat exchanger is provided which rejects additional heat as required to maintain the desired inlet temperature to the fuel cell. This heat rejection heat exchanger is controlled to decrease its effectiveness, usually by bypassing the flow, to effect this control.

It may happen at times that the waste heat heat exchanger in achieving its own needs decreases the recirculating coolant temperature to a level such that even with the heat rejection heat exchanger fully bypassed, the temperature to the fuel cell is too low. In this case it would be preferable to sacrifice the performance of the waste heating system and maintain the fuel cell at its desired operating temperature.

DESCRIPTION OF THE PREFERRED EMBODIMENT

Figure 1:
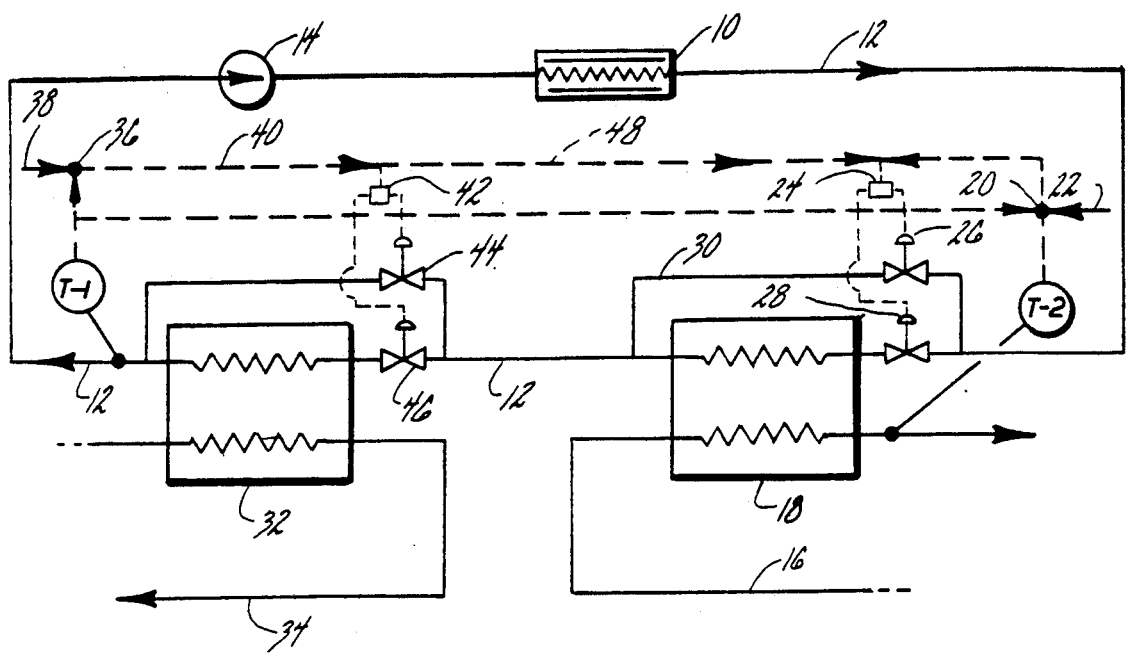
FIG. 1 is a schematic flow sheet showing the arrangement of the fuel cell power plant and the heat exchangers.

Fuel cell 10 is cooled by fluid coolant passing through fluid loop 12. Pump 14 circulates this fluid.

Fluid passing through waste heat system line 16 receives heat in heat exchanger 18 from the coolant in loop 12. Temperature sensor T2 senses the temperature of the waste heat fluid leaving the heat exchanger with this temperature at comparison point 20 being compared to the desired set point temperature 22. The signal passes to controller 24 which operates valves 26 and 28. These valves operate in opposite directions with one opening and the other closing to control the bypass through line 30 around heat exchanger 18. In this way the effectiveness of the heat exchanger is varied to achieve desired temperature at T2.

Heat rejection heat exchanger 32 has fluid passing through line 34 for the purpose of rejecting heat to waste. In heat exchanger 32 the heat is removed from the coolant fluid passing through the recirculating loop 12 for the purpose of achieving a proper temperature to the fuel cell 10. Temperature sensor T1 senses the exit temperature and sends a signal to comparison point 36 where it is compared to the desired set point temperature 38. This may be fixed temperature or a temperature varying as a function of load. An error signal passes through control line 40 to controller 42 where it operates valves 44 and 46 in opposite directions for the purpose of regulating the bypass around the heat exchanger 32. In this way the desired exit temperature from the heat exchanger arrangement is achieved.

So long as both the desired waste heat system temperature T2 and the fuel cell inlets system desired temperature at T1 can be achieved, the system operates in this manner. Should, however, there by insufficient heat to satisfy both these needs, the error signal through line 40 continues through line 48 operating on controller 24 to increase the bypass around the waste heat exchanger thereby making sufficient heat available in the fluid to maintain the appropriate temperature entering the fuel cell. At this point valve 46 will have been fully closed with valve 44 being open and heat exchanger 32 fully bypassed.

Figure 2:
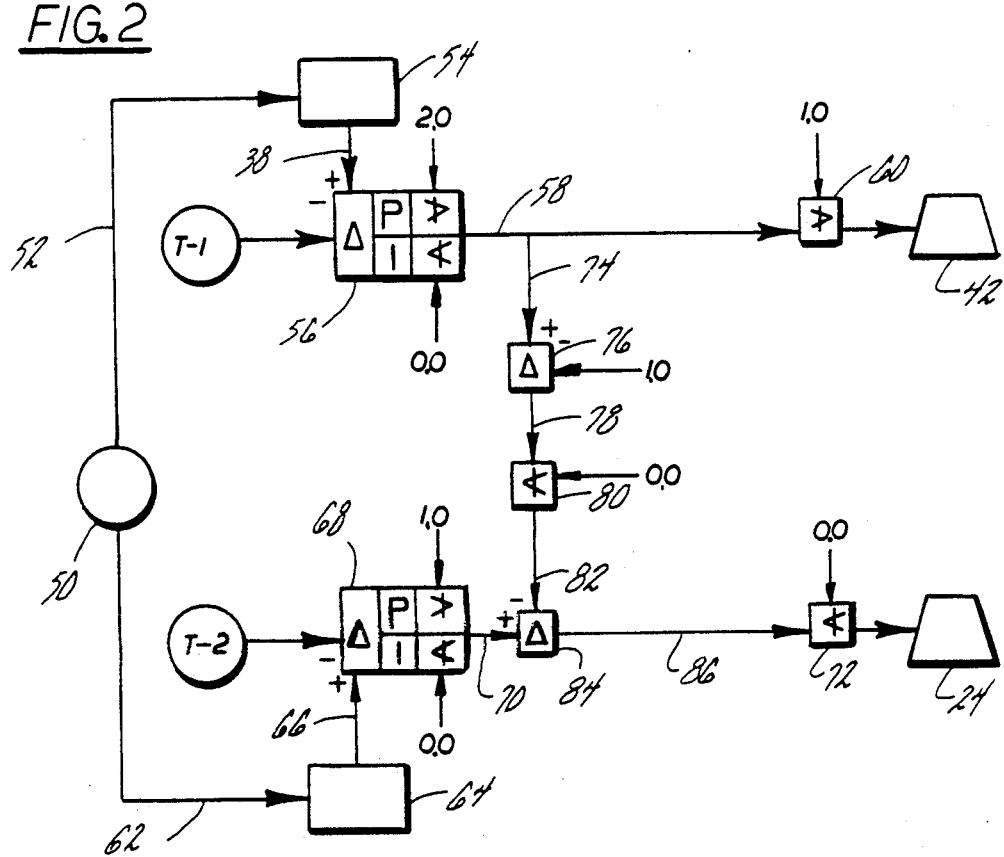
FIG. 2 is a control schematic showing the control of the two heat exchangers.

FIG. 2 illustrates a control arrangement for carrying out the above-described procedure. Load sensor 50 sends a control signal through line 52 to function generator 54 where desired temperature set point 38 is established as a function of load. This is compared to the sensed temperature of the fluid passing to the fuel cell as determined by sensor T1 providing an error signal. Proportional and integral action is introduced by controller 56. This controller also includes a high limit at 2.0 and a low limit of 0.0 with a control signal passing through line 58. The signal passes through a high limit 60 to controller 42 where a signal of 1.0 represents full bypass of heat exchanger 32.

The load sensor 50 also sends a signal from line 62 to function generator 64 which establishes a temperature set point 66 for the waste heat heat exchanger. Controller 68 compares this to the sensed temperature T2 adding proportional and integral action, and further limiting this signal between 0 and 1.0. It then passes this signal through line 70 and limiter 72 to controller 24 controlling the bypass around the waste heat exchanger 10.

So long as both temperatures may be satisfied the system operates as described above. If, however, temperature T1 cannot be raised to the set point level with the controller full open, the set point signal on line 58 exceeds 1.0. This at all times is being passed through control line 74 where at summation point 76 1.0 is subtracted, whereby only in the event of initial signal exceeding 1.0 is there a control signal in line 78. Load limiter 80 limiting the signal at 0 effectively blocks this signal any time that the signal on line 58 was at 1.0 or below. Accordingly, the residual signal indicating the excess need passes through line 82 to summation point 84 where it is subtracted from the signal 70. This modified signal passes through line 86 in limiter 72 to controller 24. Accordingly, the control system thereby achieves the function of giving priority to temperature T1 while sacrificing temperature T2 when both cannot be met.

Figure 3:
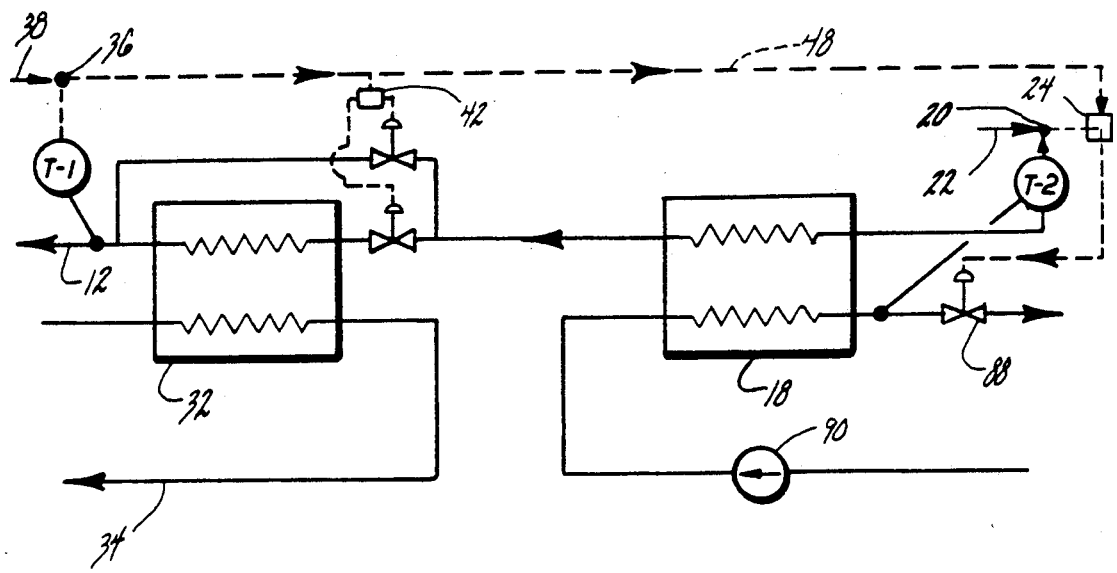
FIG. 3 is a schematic illustrating an alternate embodiment of the control of the waste heat heat exchanger.

In the embodiment of FIG. 3 an alternate method is provided for varying the effectiveness of heat exchanger 18. Effectively the flow of the waste heat fluid through the heat exchanger is pumped by pump 90 and varied by valve 88.

Figure 4:
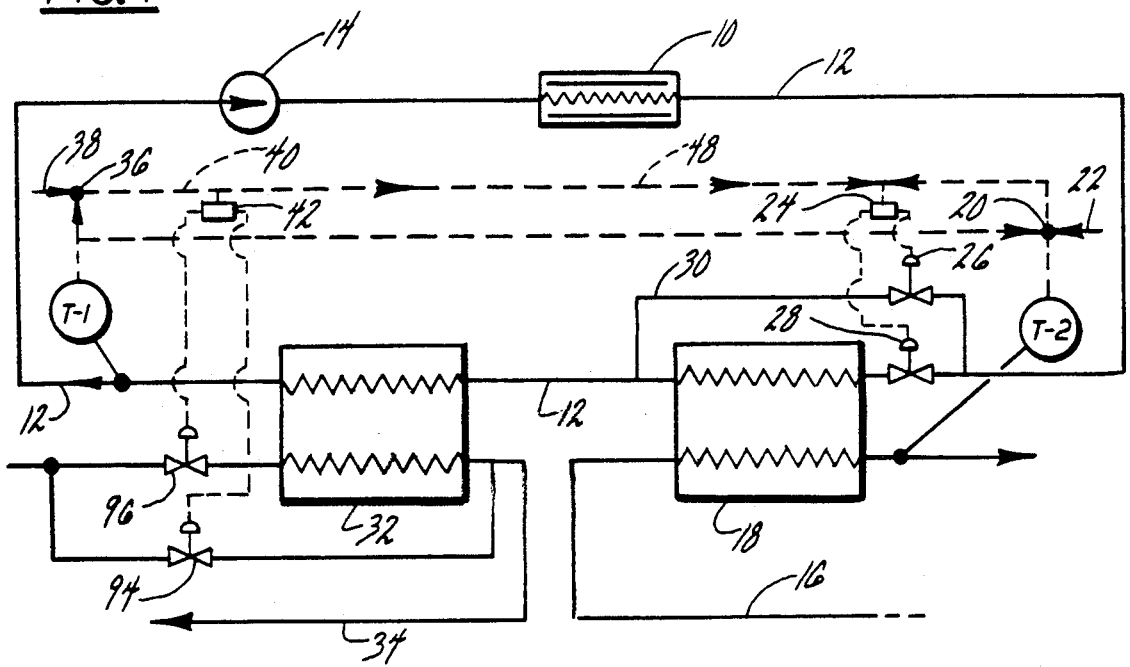
FIG. 4 shows an alternate control of the heat rejection heat exchanger.

FIG. 4 illustrates an embodiment similar to that of FIG. 1, except for the control action of controller 42. The signal from controller 42 passes to valves 94 and 96 operating them in opposite directions. The effectiveness of heat rejection heat exchanger 32 is thereby modulated by the bypass of the heat rejection fluid passing through line 34.

We claim:

1. A cooperative control arrangement for a fuel cell power plant and a waste heat recovery system comprising:
    a fuel cell power plant including fuel cells;
    a fluid loop for passing fluid coolant through said fuel cells;
    a waste heat heat exchanger located in said fluid loop at a location to receive fluid coolant leaving said fuel cells;
    a waste heat fluid flowpath through said waste heat heat exchanger for receiving heat from said coolant;
    a heat rejection heat exchanger located in said fluid loop between said waste heat heat exchanger and the return to said fuel cells;
    a heat rejection fluid flowpath through said heat rejection heat exchanger for receiving heat from said coolant;
    a waste heat temperature sensing means for sensing the temperature of the waste heat fluid leaving said waste heat heat exchanger;
    a first means for varying the heat exchange effectiveness of said waste heat heat exchanger in response to the temperature of the waste heat fluid leaving said waste heat heat exchanger;
    a coolant return temperature sensing means for sensing the temperature of coolant returning to said fuel cell;
    a coolant return set point temperature means for establishing a desired coolant return temperature;
    second means for varying the heat exchange effectiveness of said heat rejection heat exchanger in response to said coolant return temperature; and
    third means for further reducing the heat exchange effectiveness of said waste heat heat exchanger by overriding said first means in response to inability of said second means to maintain a sufficiently high coolant temperature to satisfy said coolant return set point temperature means.

2. An apparatus as in claim 1, said first means comprising:
    means for bypassing one of said coolant flow and said waste heat fluid flow around said waste heat heat exchanger.

3. An apparatus as in claim 2, said first means comprising:
    means for bypassing said coolant flow around said waste heat heat exchanger.

4. An apparatus as in claim 1, said second means comprising:
    means for bypassing said coolant flow around said heat rejection heat exchanger.

5. An apparatus as in claim 1, said coolant temperature set point means including:
    fuel cell power plant power sensing means for sensing power;
    means for setting said set point temperature as a function of said sensed power.

6. An apparatus as in claim 1, said first means comprising:
    means for varying the flow of said waste heat fluid through said waste heat heat exchanger.

7. An apparatus as in claim 1, said second means comprising:
    means for bypassing said heat rejection fluid flow around said heat rejection heat exchanger.

* * * * *